United States Patent [19]

Takeyasu

[11] Patent Number: 5,172,045
[45] Date of Patent: Dec. 15, 1992

[54] BATTERY CHARGER FOR MOBILE APPARATUS

[75] Inventor: Kenji Takeyasu, Hyogo, Japan

[73] Assignee: Mitsubishi Denki Kabushiki Kaisha, Tokyo, Japan

[21] Appl. No.: 774,619

[22] Filed: Oct. 10, 1991

[30] Foreign Application Priority Data

Oct. 19, 1990 [JP] Japan .................. 2-280589

[51] Int. Cl.$^5$ .............................. H02J 7/00
[52] U.S. Cl. ........................ 320/37; 320/38; 320/15
[58] Field of Search ............. 320/37, 38, 15; 307/66

[56] References Cited

U.S. PATENT DOCUMENTS

| 4,286,204 | 8/1981 | Belot | 320/31 |
| 4,983,904 | 1/1991 | Iwahashi | 320/38 X |
| 5,089,762 | 2/1992 | Sloan | 320/38 X |

FOREIGN PATENT DOCUMENTS 55-112438 8/1980 Japan .

Primary Examiner—R. J. Hickey
Attorney, Agent, or Firm—Rothwell, Figg, Ernst & Kurz

[57] ABSTRACT

A battery charger includes a switching circuit (8) for supplying the current to the timer (3) from the secondary battery (6). The battery charger also includes a detecting circuit (7) for activating the switching circuit (8) by charging the voltage into the capacitor (11). Further, the battery charger includes diodes (16) and (14) for supplying the current to the timer (3) from the outside battery (22) and from the secondary battery (6) respectively, and for preventing backward current flow to the respective power sources. The battery charger of the present invention prevents overcharging and extends the lifetime of the secondary battery in the mobile apparatus.

3 Claims, 2 Drawing Sheets

BATTERY CHARGER FOR MOBILE APPARATUS

BACKGROUND OF THE INVENTION

1. Field of the Invention

The present invention relates to a battery charger, and more specifically, to a battery charger which prevents the secondary battery of a mobile apparatus from overcharging.

2. Description of the Prior Art

FIG. 2 shows a circuit diagram of the conventional prior art battery charger which charges a secondary battery for a mobile apparatus, for example, a mobile telephone. In FIG. 2, the battery charger includes a charge circuit 2 which provides a charging current corresponding to the current capacity of a secondary battery 6 through a transistor 4 and a diode 5. A timer 3 works from the voltage supplied from an outside battery 22, such as a car battery, and sets the charging time. When the set time expires, the timer 3 outputs a cut off signal to the transistor 4. The transistor 4 then cuts off the charging current and stops charging the secondary battery 6. The diode 5 prevents backward current flow from the secondary battery 6 when the voltage of the secondary battery is higher than the output voltage of the charge circuit 2. The voltage is supplied to the mobile apparatus 100 from the outside battery 22 in the car through the connector 1. A starting motor 21 for starting the car engine is activated by closing a starting switch 23.

The operation of the above conventional prior art is explained hereinafter.

First of all, when the voltage is applied to the charge circuit 2 through the connector 1 from the outside battery 22, the charge circuit 2 outputs a predetermined charging current corresponding to the secondary battery rated current capacity so that the secondary battery 6 is charged optimally through the transistor 4 and the diode 5.

When the voltage is applied to the timer 3, the timer 3 sets the timer counter and the timer counter starts to count the charging time for charging the secondary battery 6. When the timer 3 is set, the timer 3 outputs a low level signal (for example, 0 volt) and activates the transistor 4. By applying the low level signal to the base of the transistor 4 from the timer 3, the current from the charge circuit 2 is supplied to the secondary battery 6 through the transistor 4 and the diode 5 so that the secondary battery is charged. After the predetermined set time is over, the timer 3 outputs a high level signal (for example, 6 volts) to the transistor 4. Then the transistor 4 cuts off the charging current so that overcharging of the secondary battery 6 is prevented.

Since the battery charger uses the car battery as the outside battery, if the starting motor 21 is activated by closing the starting switch 23, the voltage at the connector 1 drops by a large amount for several seconds. The resulting abrupt decrease of the applied voltage to the timer 3 causes the timer counter in the timer 3 to reset and the timer counter starts to count the charging time (usually, 4 hours to 8 hours) from the beginning. Because of this reset of the timer counter, the secondary battery 6 is charged from the beginning of the set time period and the secondary battery becomes overcharged. Because of the overcharging, the lifetime of the secondary battery is greatly reduced.

It is a primary object of the present invention to provide a battery charger which prevents the secondary battery in a mobile apparatus from overcharging, when the voltage of the outside power source happens to drop for several seconds as a result of starting the car engine.

SUMMARY OF THE INVENTION

In accordance with one embodiment of the present invention, a battery charger having a charge circuit for supplying the charge current to a secondary battery, a timer for setting the timer counter to count the charging time of the secondary battery, a transistor for supplying and cutting off the charge current from the charge circuit to the secondary battery and a diode for preventing the backward current from the secondary battery, are provided with a switching circuit for supplying the current to the timer from the secondary battery. The battery charger also includes a detecting circuit for activating the switching circuit in response to the charge on the capacitor. Further, the battery charger includes two diodes for supplying the current to the timer from the outside battery and from the secondary battery respectively, and for preventing backward current flow to the respective power sources.

DETAILED DESCRIPTION OF THE PREFERRED EMBODIMENTS

Figure 1:
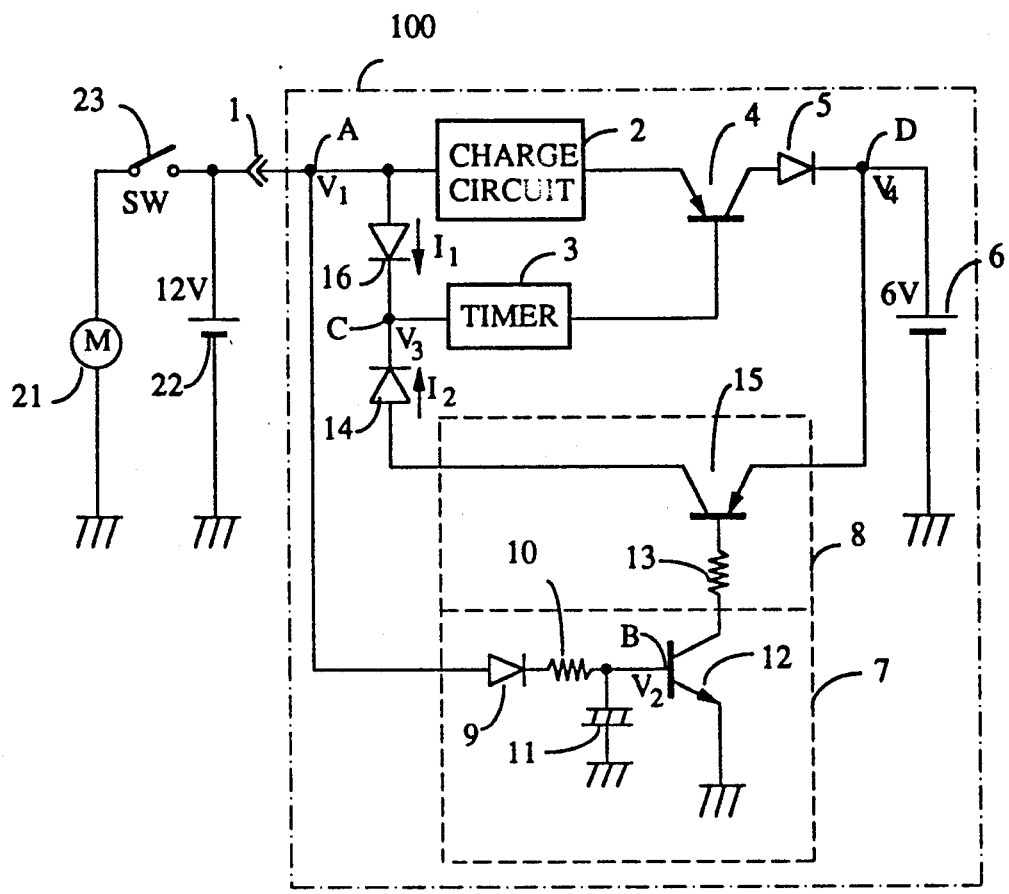
FIG. 1 shows a circuit diagram of an embodiment of a battery charger for a mobile apparatus in accordance with the present invention.
Figure 2:
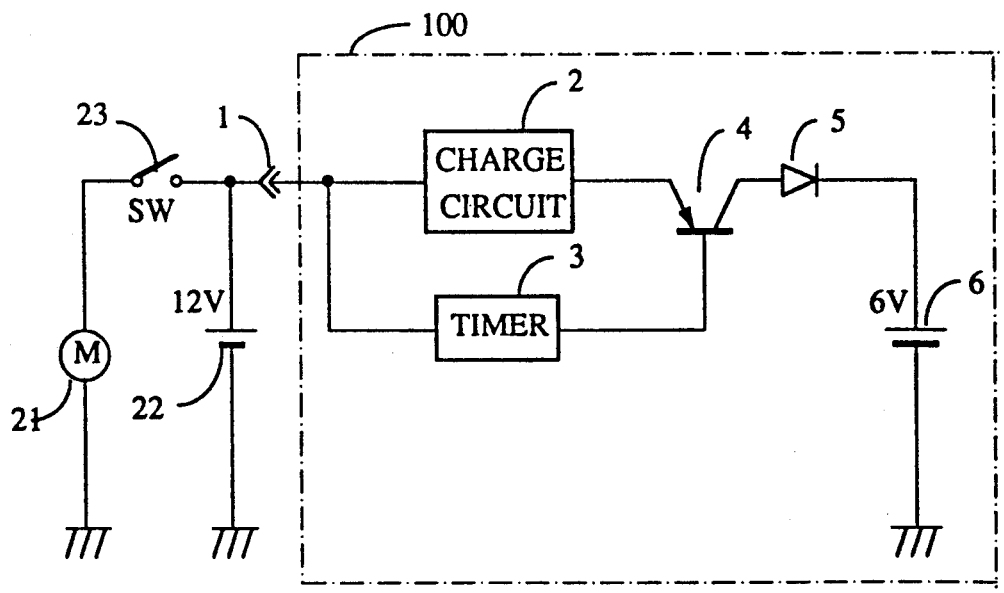
FIG. 2 shows a prior art battery charger for a mobile apparatus.

Referring to FIG. 1, the outside battery 22 supplies electric power to the mobile apparatus 100. The connector 1 is connected directly to a charge circuit 2, to a timer 3 via a diode 16, and directly to a diode 9. A charge circuit 2 provides a charging current corresponding to the rated current capacity of a secondary battery 6 through a transistor 4 and a diode 5.

A timer 3 works from the voltage supplied via a diode 16 from the outside battery 22, which is part of the car equipment, and sets the charging time. The diode 16 prevents backward current flow from the secondary battery 6 to the outside battery 22 through transistor 15 and the diode 14 when the voltage of the outside battery 22 is lower than that of the secondary battery 6. When the set time has expired, the timer 3 outputs the cut off signal to the transistor 4. Then, the transistor 4 cuts off the charging current and stops charging the secondary battery 6. The diode 5 prevents backward current flow from the secondary battery 6 when the voltage of the secondary battery 6 is higher than the output voltage of the charge circuit 2.

A detecting circuit 7 consists of a diode 9, a resistor 10, a capacitor 11 and a transistor 12. The voltage from the outside battery 22 is applied to the capacitor 11 through the diode 9 which prevents backward current flow from the capacitor 11 to the battery 22 via the resistor 10. The voltage charge on the capacitor 11 is applied to the base of the transistor 12 and activates the transistor 12. When the voltage of the outside battery 22 is a steady state condition, the current is supplied from the outside battery 22 to the capacitor 11.

A switching circuit 8 consists of a transistor 15 and a resistor 13. The base of the transistor 15 is connected to the collector of the transistor 12 through the resistor 13, the emitter of the transistor 15 is connected to the secondary battery 6, and the collector of the transistor 15 is connected to the minus terminal of a diode 14. A starting motor 21 for starting the car engine is activated using a starting switch 23.

The operation of the present embodiment is explained hereinafter.

First of all, when the voltage is applied to the charge circuit 2 through the connector 1 from the outside battery 22, the charge circuit 2 outputs a predetermined charging current corresponding to the secondary battery rated current capacity so that the secondary battery 6 is charged through the transistor 4 and the diode 5.

When the voltage is applied to the timer 3 from the outside battery 22 through the diode 16, the timer 3 sets the timer counter in the timer 3, and the timer counter begins to count the charging time for charging the secondary battery 6. When the timer 3 is set, the timer 3 outputs a low level signal (for example, 0 volt) and activates the transistor 4. By applying a low level signal to the base of the transistor 4 from the timer 3, the current from the charge circuit 2 is supplied to the secondary battery 6 through the transistor 4 and the diode 5 so that the secondary battery is charged. After the predetermined set time has expired, the timer outputs a high level signal (for example, 6 volts) to base of the transistor 4. Then, the transistor 4 cuts off the charging current so that overcharging of the secondary battery 6 is prevented.

Since the battery charger uses the car battery, if the starting motor 21 is activated by closing the starting switch 23, the voltage at the connector 1 drops by a large amount for several seconds. The decrease of the applied voltage to the timer 3 causes the timer counter in the timer 3 to reset in the prior art system. However in the present invention, the voltage is applied instantaneously to the timer 3 from the secondary battery 6 through the transistor 15 and the diode 14. As a result, the timer counter is not reset, and the secondary battery 6 is prevented from overcharging. Accordingly, the lifetime of the secondary battery is greatly extended.

Figure 3:
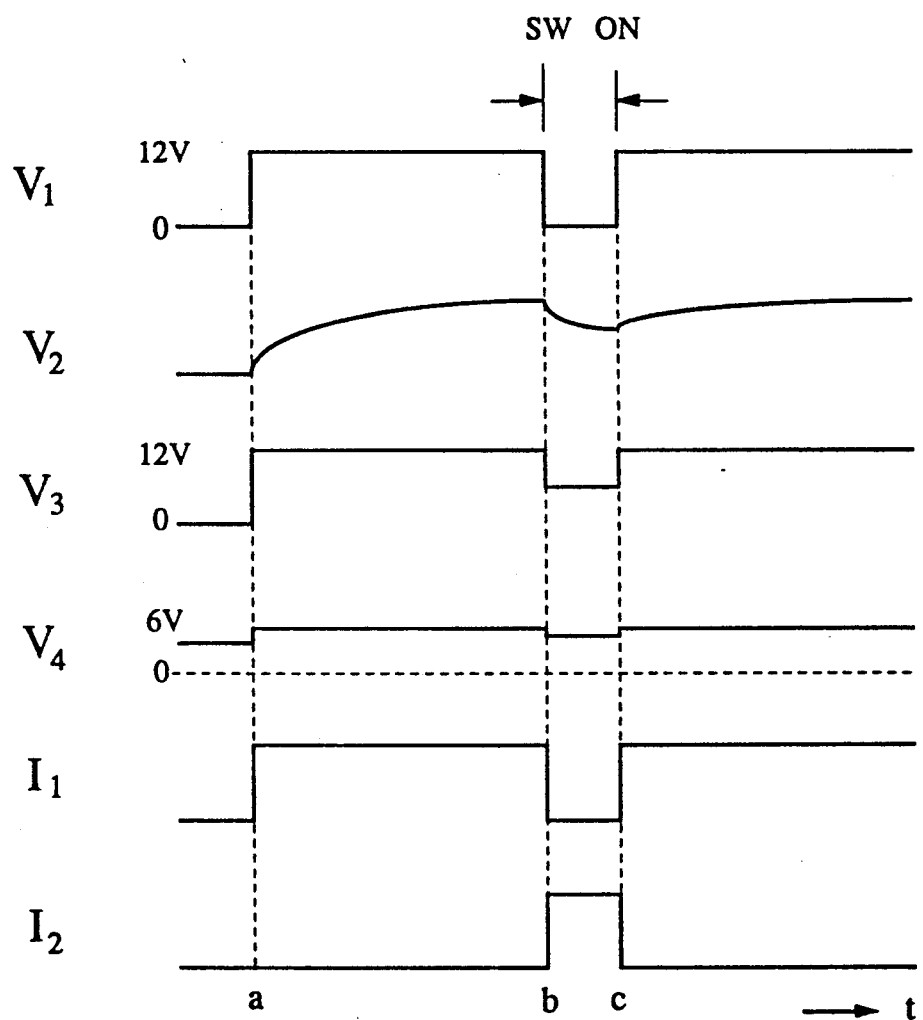
FIG. 3 shows a timing chart of the circuit of the present invention.

The operation of the present embodiment is also explained in detail using time chart of the FIG. 3.

FIG. 3 shows a time chart of the voltages and currents at certain positions in the circuit of the present invention shown in FIG. 1.

The letters $V_1$, $V_2$, $V_3$ and $V_4$ in FIG. 3 indicate the voltage waves at points A, B, C and D in FIG. 1. $I_1$ and $I_2$ indicate the current waves flowing in the diodes 16 and diode 14 respectively.

In FIG. 3, at the time before the voltage of the outside battery 22 is applied to the mobile apparatus 100, that is, at the time before the outside battery 22 is connected to the mobile apparatus 100 through the connector 1, the voltages $V_1$, $V_2$ and $V_3$ at points A, B and C are zero volts, and the voltage $V_4$ at the point D is equal to the discharge voltage (for example, about 4 volts) of the secondary battery $6_1$.

At the time (point "a" in FIG. 3) when the mobile apparatus is connected to the outside battery 22 via connector 1, the voltages and the currents are as explained hereinafter.

$V_1$ at point A goes up to the outside battery voltage (for example, 12 volts) instantaneously.

$V_2$ at point B goes up to the outside battery voltage (for example, 12 volts) according to the exponential curve determined by the RC time constant of the resistor 10 and the capacitor 11.

$V_3$ at point C goes up to the outside battery voltage (for example, 12 volts) instantaneously, and supplies power to the timer 3.

$V_4$ at point D goes up to the charging voltage (about 6 volts) from the discharge voltage (for example, of about 4 volts) to supply the charging voltage from the charge circuit 2 via diode 5.

$I_1$ goes up to some value in supplying current from the outside battery to the timer 3 through the diode 16.

$I_2$ remains zero until the time at point "b", because the voltage of the point A is larger than that of the point D.

At a time (point "b" in FIG. 3) when the starting switch 23 is closed by the driver for driving the engine, the voltages and the currents becomes as explained hereinafter.

$V_1$ at point A goes down to, for example, zero volts, instantaneously at the worst condition.

$V_2$ at point B goes down according to the exponential curve determined by the RC time constant of the resistance of the transistor 12 and the capacitor 11.

$V_3$ at point C goes down to the secondary battery voltage (for example, 6 volts) instantaneously, and supplies the power, which is sufficient for making the timer 3 continue operation.

$V_4$ at point D goes down to the discharge voltage (for example, 4 volts).

$I_1$ goes down to zero at the time "b", because the voltage of point D is larger than that of point A.

$I_2$ is goes up to some value to supply the voltage from the secondary battery 6 to the timer 3 through the transistor 15 and the diode 14.

At the time (point "c" in FIG. 3) when the voltage of the outside battery 22 has recovered, the voltages and the currents of the battery charger become as explained hereinafter.

$V_1$ at point A again goes up to the outside battery voltage (for example, 12 volts) instantaneously.

$V_2$ at point B again goes up to the outside battery voltage (for example, 12 volts) according to the exponential curve determined by the time constant of the resistor 10 and the capacitor 11.

$V_3$ at point C again goes up to the outside battery voltage (for example, 12 volts) instantaneously, and supplies the power to the timer 3.

$V_4$ at point D again goes up to the charging voltage (about 6 volts) from the discharge voltage to supply the charging voltage from the charge circuit 2 via diode 5.

$I_1$ is goes up to some value for supplying the timer 3 from the outside battery through the diode 16. $I_2$ again goes down to zero at time "c", because the voltage of point A becomes larger than that of point D.

The embodiments described above may also be applied to other battery chargers for mobile apparatus, such as, cordless telephones, cordless electrical shavers and cordless electrical irons.

What is claimed is:

1. A battery charger for a mobile apparatus having a charge circuit for supplying charge current to a secondary battery, a timer for setting the timer counter to count the charging time of the secondary battery, a first transistor for supplying and cutting off the charge current supplied from the charge circuit to the secondary battery and a first diode for preventing backward current flow from the secondary battery, comprising:

a switching circuit for supplying current to the timer from the secondary battery;

a detecting circuit for activating the switching circuit; and second and third diodes for supplying current to the timer from an outside battery and from the secondary battery respectively, and for preventing backward current to the respective batteries.

2. The battery charger for a mobile apparatus of claim 1, wherein said detecting circuit comprises a fourth diode, a resistor, a capacitor and a second transistor wherein the voltage stored in the capacitor activates the second transistor.

3. The battery charger for a mobile apparatus of claim 2, wherein said switching circuit comprises a third transistor and a resistor and wherein the base of the third transistor is connected to the collector of the second transistor through the resistor, the emitter of the third transistor being connected to the secondary battery, and the collector of the third transistor being connected to the minus terminal of the second diode.

* * * * *

UNITED STATES PATENT AND TRADEMARK OFFICE
CERTIFICATE OF CORRECTION

PATENT NO. : 5,172,045

DATED : December 15, 1992

INVENTOR(S) : Kenji Takeyasu

It is certified that error appears in the above-identified patent and that said Letters Patent is hereby corrected as shown below:

Column 3, line 60, "$6_1$." should be --6.--.

Signed and Sealed this

Sixteenth Day of November, 1993

*Attest:*

BRUCE LEHMAN

*Attesting Officer*  *Commissioner of Patents and Trademarks*